(12) United States Patent
Seminel

(10) Patent No.: US 10,787,243 B2
(45) Date of Patent: Sep. 29, 2020

(54) PROTECTION OF PROPELLER COMPONENTS

(71) Applicant: Ratier-Figeac SAS, Figeac (FR)

(72) Inventor: Bruno Seminel, Lissac-et-Mouret (FR)

(73) Assignee: RATIER-FIGEAC SAS, Figeac (FR)

( * ) Notice: Subject to any disclaimer, the term of this patent is extended or adjusted under 35 U.S.C. 154(b) by 65 days.

(21) Appl. No.: 16/032,409

(22) Filed: Jul. 11, 2018

(65) Prior Publication Data

US 2019/0016440 A1 Jan. 17, 2019

(30) Foreign Application Priority Data

Jul. 13, 2017 (EP) ..................................... 17305938

(51) Int. Cl.
*B64C 11/20* (2006.01)
*B64C 11/18* (2006.01)

(52) U.S. Cl.
CPC ............ *B64C 11/205* (2013.01); *B64C 11/18* (2013.01)

(58) Field of Classification Search
None
See application file for complete search history.

(56) References Cited

U.S. PATENT DOCUMENTS

| 1,545,560 A * | 7/1925 | Heath ................... B64C 11/205 |
| | | 416/224 |
| 4,594,761 A | 6/1986 | Murphy et al. |
| 5,375,978 A | 12/1994 | Evans |
| 2015/0330231 A1* | 11/2015 | McGuire ................... F01D 5/28 |
| | | 428/36.9 |

FOREIGN PATENT DOCUMENTS

| DE | 102011009421 A1 | 7/2012 |
| FR | 824091 A | 2/1938 |

OTHER PUBLICATIONS

Extended European Search Report for International Application No. 17305938.7 dated Nov. 3, 2017, 7 pages.

* cited by examiner

*Primary Examiner* — Igor Kershteyn
*Assistant Examiner* — Juan G Flores
(74) *Attorney, Agent, or Firm* — Cantor Colburn LLP

(57) ABSTRACT

A propeller component, for example a propeller blade airfoil, includes an external surface exposed in use to an oncoming airstream (A), and a protective polymeric film applied over substantially the entire exposed external surface of the component.

20 Claims, 5 Drawing Sheets

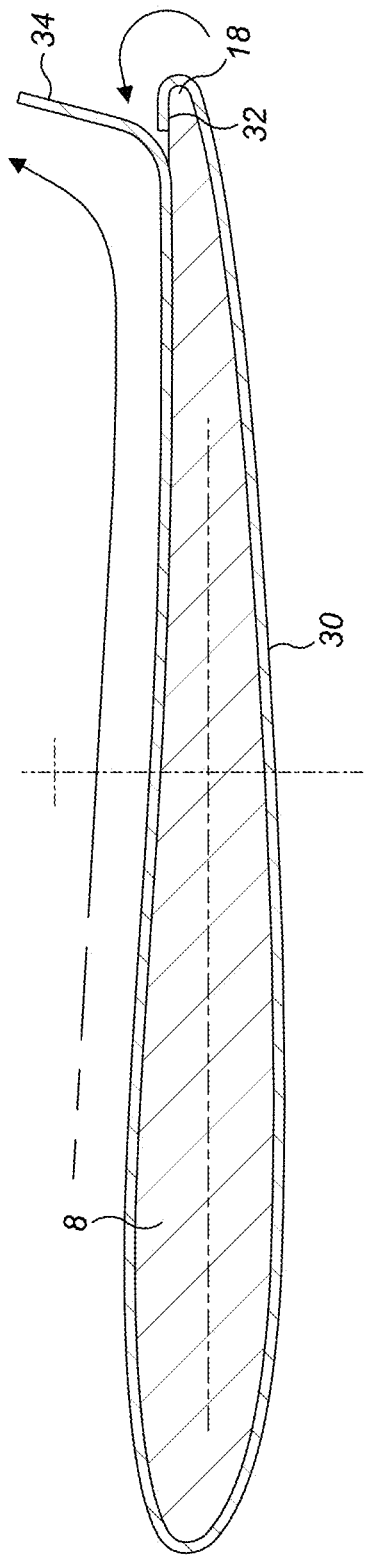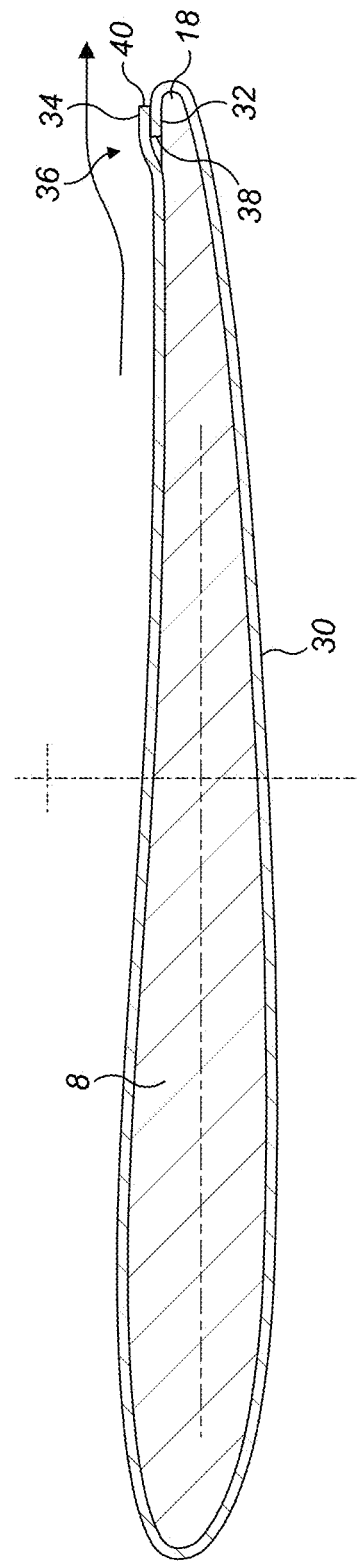

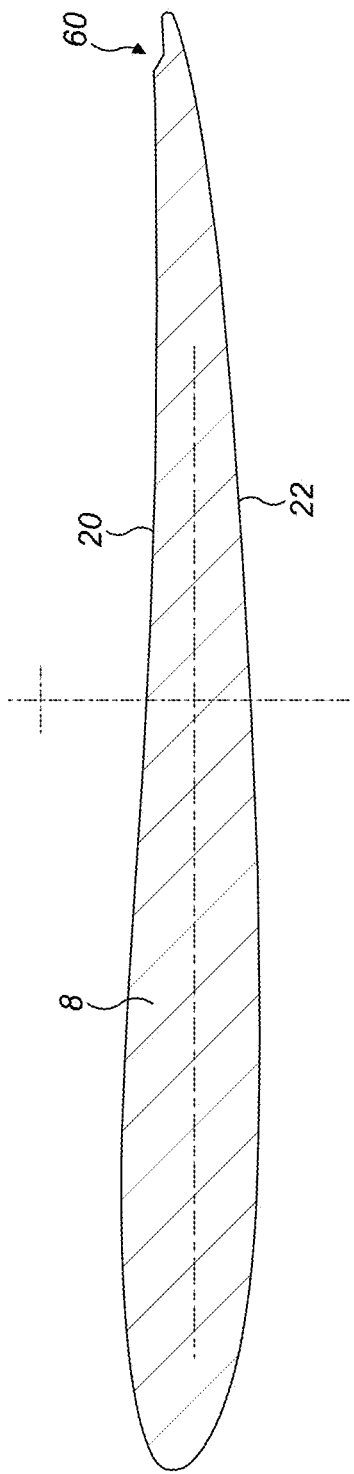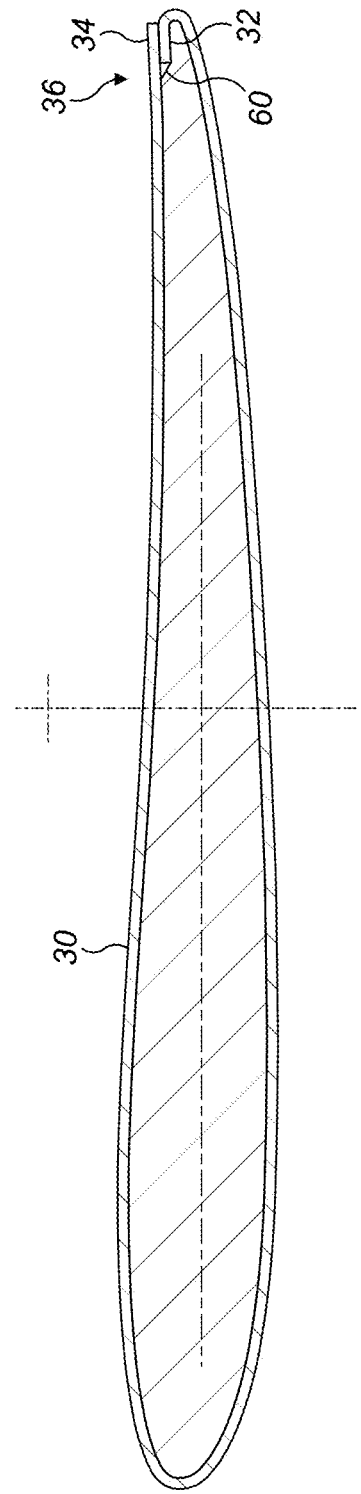
FIG. 4A
FIG. 4B

PROTECTION OF PROPELLER COMPONENTS

FOREIGN PRIORITY

This application claims priority to European Patent Application No. 17305938.7 filed Jul. 13, 2017, the entire contents of which is incorporated herein by reference.

TECHNICAL FIELD

The present disclosure relates to the protection of propeller components such as propeller blades and spinners.

BACKGROUND

Propeller components such as propeller blades and propeller spinners experience wear and erosion in use due to airborne particulate material. To protect against erosion, the component is painted with an anti-erosion paint. This process may require sophisticated control as the blade weight & balancing moment, as well as the erosion resistance will depend on the thickness of the coating layer applied. Also, repair of the coating may be time consuming since it is necessary to completely remove the paint mechanically, chemically or thermally before re-applying a new paint layer. The basic component may be damaged during paint removal process leading to expensive repairs or scrap.

In addition, stickers or decals may be bonded to the component, for example bearing a manufacturer's logo and name for 'marketing" purpose. These may also cause rejections during manufacture or repair as well as in service and surface discontinuities.

Also, in addition to erosion resistant paint, additional paint may be applied to the component in certain regions. For example a yellow pattern is often painted at the tip of a propeller blade. This requires additional process steps and possible surface discontinuities.

SUMMARY

From a first aspect, the disclosure provides a propeller component comprising an external surface exposed in use to an oncoming airstream, and a protective polymeric film applied over substantially the entire exposed external surface of the component.

In various embodiments, the protective polymeric film is continuous in areas of expected maximum erosion, for example in a leading edge area of the component.

In various embodiments, the protective polymeric film has first and second end portions, the first and second end portions overlapping in a joint area.

In various embodiments, the joint area is in a low erosion area, for example in a trailing edge area of the component.

In various embodiments, the overlapping end portions of the protective polymeric film are arranged such that a free edge of the overlapped end portion faces in a direction towards the direction of the airstream, for example towards a leading edge of the component.

In various embodiments, the external surface of the component comprises a recess for receiving the first end portion of the protective polymeric film.

In various embodiments, the protective polymeric film is a one piece film.

In various embodiments, the component may be a blade airfoil of a propeller blade, the protective polymeric film being applied over substantially the entire exposed surface of the blade airfoil. In other embodiments the propeller component may be a propeller spinner.

The disclosure also provides a method of protecting a propeller component from erosion comprising applying a protective polymeric film over substantially the entire exposed external surface of the component.

Various embodiments comprise wrapping the protective polymeric film around the entire exposed external surface.

Various embodiments may comprise overlapping end regions of the protective polymeric film.

In various embodiments, the overlapping end regions may be in a low erosion region of the surface.

In various embodiments a recess may be provided in the external surface of the component to receive a first end region of the protective polymeric film.

In various embodiments, the protective polymeric film may be polyurethane.

In various embodiments, the protective polymeric film may have a thickness of 0.1 to 1.0 mm, for example 0.15 to 0.2 mm.

In various embodiments, an exposed surface of the protective polymeric film may be printed.

The disclosure also provides a method of repairing a propeller component in accordance with the disclosure, comprising removing a damaged protective polymeric film from the exposed external surface and applying a replacement protective polymeric film over the surface.

BRIEF DESCRIPTION OF DRAWINGS

An embodiment of the disclosure will now be filed by way of example only with reference to the accompanying drawings in which:

FIGS. 3A to 3D illustrate, schematically, a method in accordance with the disclosure; and FIGS. 4A and 4B illustrate, schematically a second embodiment of the disclosure.

DETAILED DESCRIPTION

Figure 1:
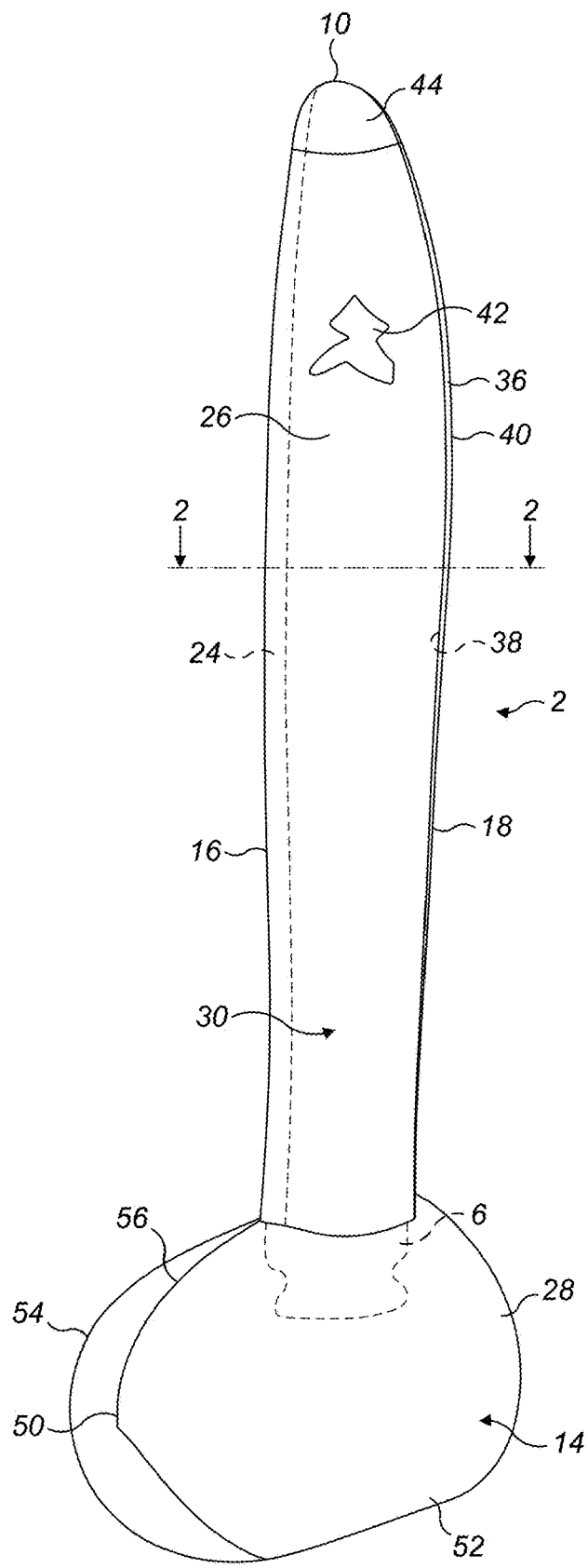
FIG. 1 illustrates, schematically, a propeller assembly provided with a protective polymeric film in accordance with the disclosure.
Figure 2:
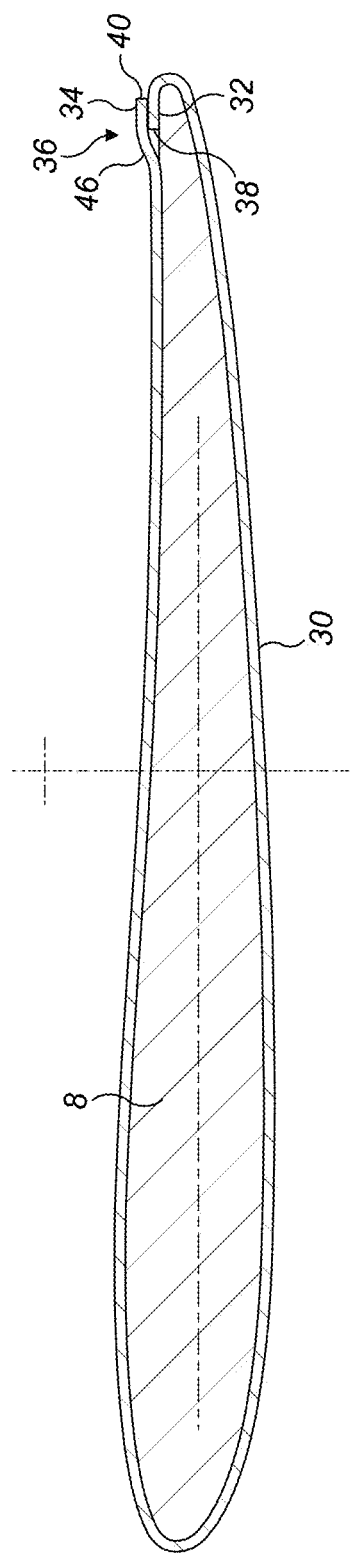
FIG. 2 is a sectional view taken along line 2-2 of FIG. 1.

With reference to FIGS. 1 and 2, a propeller assembly 2 comprises a propeller blade 4 having a blade root 6 and a blade airfoil 8 extending outwardly from the blade root 6 to a tip 10. The propeller blade 4 is retained in a hub 12 by means of the blade root 6, as is known in the art. A forward part of the hub 12 is capped by a spinner 14.

The blade airfoil 8 further has a leading edge 16 and a trailing edge 18, a pressure side 20 and a suction side 22. In some embodiments, a protective sheath 24 may optionally be mounted over the leading edge 16 of the blade airfoil 8, as shown. The protective sheath 24 may extend over the entire length of the leading edge 16 or over only a portion thereof.

It will be appreciated that the entire external surface 26 of the blade airfoil 8 from the blade root 6 to the tip 10 and the entire external surface 28 of the spinner 14 will, in use, be exposed to an oncoming air flow A. That airflow A will contain particulate contaminants which may cause erosion of the exposed surfaces 26, 28. To protect the surfaces 26, 28 against erosion, in accordance with this disclosure, a protective polymeric film 30 is provided over one or both of the entire exposed surfaces 26, 28.

In embodiments of the disclosure, the protective polymeric film 30 may be a polyurethane film, although other materials, for example a vinyl polymer, for example PVC, may be suitable. Polyurethane may be advantageous in that it may have appropriate mechanical properties, for example anti-tearing properties, wear resistance, damping characteristics and resilience performance.

The protective polymeric film 30 may have a thickness in the order of 0.1 to 1.0 mm, for example 0.15 to 0.2 mm. The particular thickness may be determined as appropriate for any particular application.

In embodiments, the protective polymeric film 30 is a one piece film, which is wrapped around the exposed external surface 26, 28. In other embodiments, however, the protective polymeric film may comprise a plurality of separate pieces applied to the exposed external surface 26, 28.

As illustrated in FIGS. 2 and 3, which illustrate applying the protective polymeric film 30 to the blade airfoil 8, it will be seen that the protective polymeric film 30 has a first end portion 32 and a second end portion 34. The first and second end portions 32, 34 overlap at a joint area 36. The region of the exposed external surface 26 adjacent the leading edge 16 of the blade airfoil 8 is likely to experience the most erosion and is therefore advantageously continuous, as can be seen for example in FIG. 2. The region of the exposed external surface 26 adjacent the trailing edge 18 of the of the blade airfoil 8, however, is likely to experience less erosion, so in embodiments the joint area 36 may be provided in the rear half of the chord of the blade airfoil 8, where the aerodynamic impact of the joint area 36 may be minimised. In embodiments, the joint area 36 may be displaced forwardly from the trailing edge 18 of the blade airfoil 8 by at least 5% or 10% of the chord of the blade airfoil 8.

In the illustrated embodiment, it will be seen that the free edge 38 of the first end portion 32 of the protective polymeric film 30 which faces in the direction of the airstream A is covered by the second end portion 34 of the protective polymeric film 30. The free edge 40 of the second end portion 34 of the protective polymeric film 30 points away from the airstream A, reducing the possibility of delamination of the joint area 36. It will also be seen that the joint area 36 is on the pressure side 20 of the blade airfoil 8. Again this may assist in preventing delamination of the joint area. Of course in other embodiments, the joint area 36 may be provided on the suction side 22 of the blade airfoil 8.

The surface of the protective polymeric film 30 around substantially the entire external surface 26 of the blade airfoil 8 is continuous, leading to improved airflow over the surface 26 and thereby potentially improved aerodynamic performance and reduced noise. Moreover, the joint area 36 is relatively smooth, there being no discontinuity in the direction facing the airstream A.

The protective polymeric film 30 may be transparent or opaque and may have a matt or gloss appearance, as required. The colour of the protective polymeric film 30 may also be chosen as appropriate, allowing easy customisation of a blade colour in line with a customer's requirements. Polyurethane films for example, are available in a wide range of colours.

In addition, the protective polymeric film may be printed in an appropriate location with a decorative pattern or information 42, for example a manufacturer's identification information 42, or tip indicator 44. This will be visible in the completed blade 4. This avoids the need for separate application of stickers etc., thus avoiding discontinuities in the blade profile and avoiding the need for a separate application process.

The method of installing the protective polymeric film 30 will now be described with reference to FIGS. 3A to 3D.

Figure 3A:
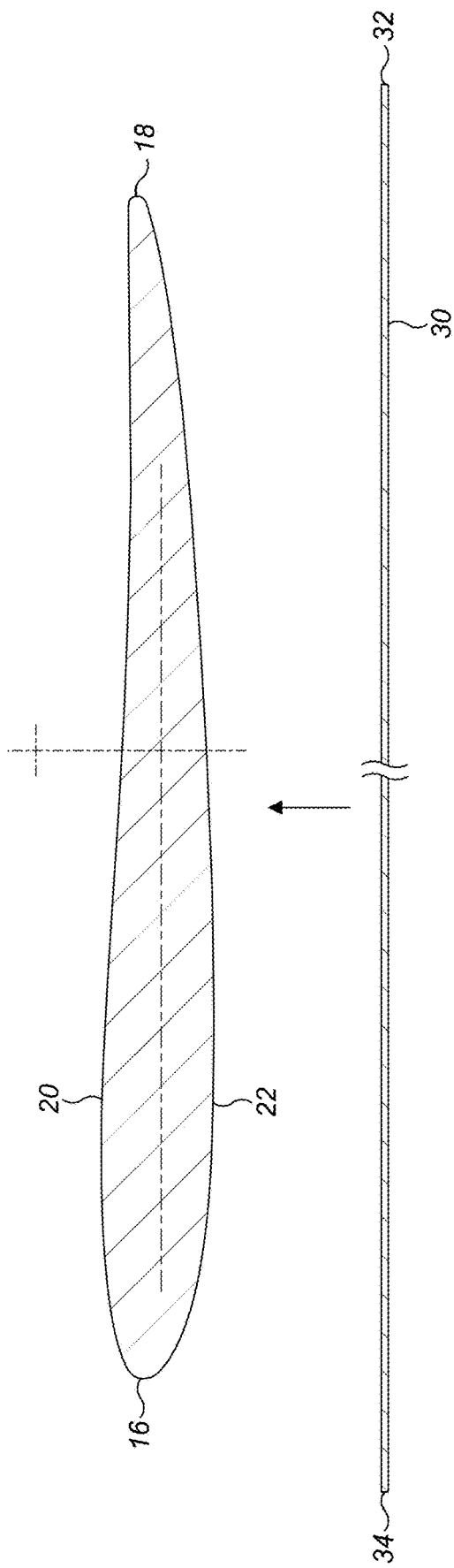

In a first stage, illustrated in FIG. 3A, a length of polymeric protective film 30, for example polyurethane, is cut to an appropriate shape and length.

Figure 3B:
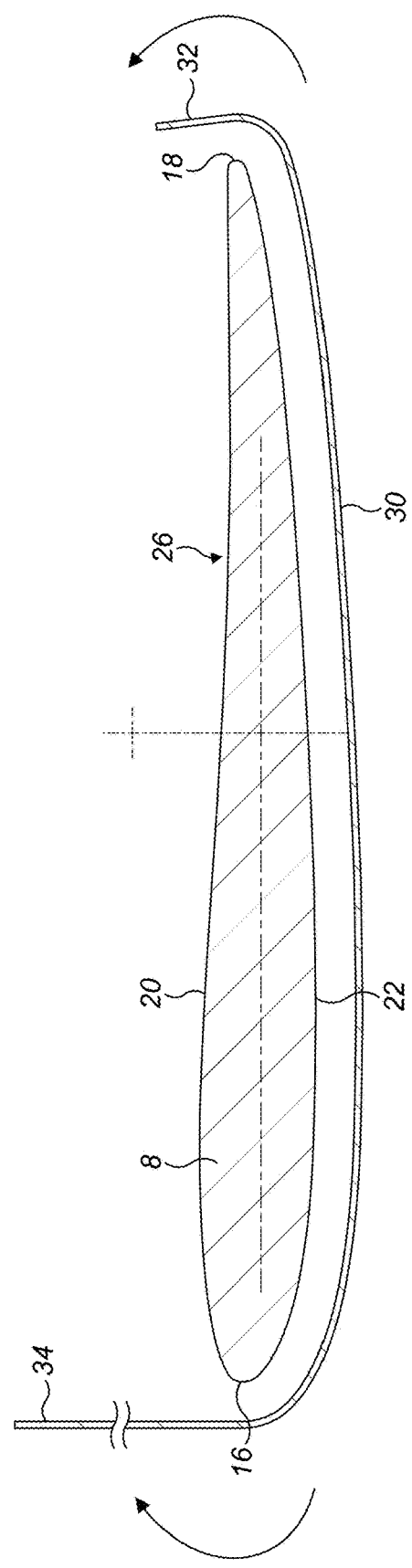

In a next step, illustrated in FIGS. 3B and 3C, the protective polymeric film 30 is wrapped about the blade airfoil 8 and adhered thereto. The protective polymeric film 30 may be provided with an adhesive backing for this purpose, or a separate adhesive may be used.

In this embodiment, the protective polymeric film 30 is of a length such that the first and second end portions 32, 34 of the protective polymeric film 30 will overlap in a joint area 36 as will be described further below. In other embodiments, however, the protective polymeric film 30 may be cut such that the first and second end portions substantially abut, rather than overlap.

In this embodiment, the first end portion of the protective polymeric film 30 wraps around the trailing edge 18 of the blade airfoil 6 by only a small amount (for example by less than 10% of the chord of the blade airfoil 8. The second end portion 34 of the protective polymeric film 30 is of such a length that it overlaps the first end portion 32 of the protective polymeric film 30. The second portion 34 of the protective polymeric film 30 may then be trimmed to an appropriate length and then adhered to the first portion 32 of the protective polymeric film 30 as shown in FIG. 3D.

In this manner, the edge 38 of the first end portion 32 of the protective polymeric film 30 is not exposed to the oncoming airstream A in use, and a smooth step is provided facing the airstream. The free edge 40 of the second end portion 34 of the protective polymeric film 30 faces away from the airstream A, thereby reducing the risk of it separating from the first end portion 32 of the protective polymeric film 30.

As well as substantially simplifying the construction of the blade 4 in the first instance, the present disclosure may also substantially facilitate repair of the blade 4. To repair the blade 4, the damaged protective polymeric film 30 may be removed in any convenient manner, for example by tearing, the exposed surface 26 of the blade airfoil 8 cleaned and prepared as necessary and a new protective polymeric film 30 then applied as above.

If present, the leading edge sheath 24 will also be protected by the protective polymeric film 30.

It will be appreciated that the embodiment described above is by way of example only and that modifications may be made thereto within the scope of the disclosure. For example, while described primarily in the context of the blade airfoil 8 of the blade 4, the protective polymeric film 30 may also or alternatively be applied to the spinner 14. In such an embodiment, the protective polymeric film 30 may comprise a plurality of axially extending, circumferentially overlapping arms extending from the tip 50 of the spinner 14. In the arrangement illustrated schematically in FIG. 1, the film 30 may comprise two parts 52, 54, with an axially extending overlap 56. In an alternative embodiment, however, depending on the shape of the spinner it may be possible to provide a single part covering.

In other embodiments, to minimise the aerodynamic effect of the joint area 36, the component, for example the blade airfoil 8, may be provided with a recess 60 in the region of the joint area 36. This may avoid a bump being formed in the region of the joint area. Such an embodiment is illustrated in FIGS. 4A and 4B. In this embodiment it will be seen that the first end portion 32 of the protective polymeric film 30 is received in the recess 60. There is then no step defined at the second end portion 34 of the protective polymeric film 30 in the joint area 36, possibly leading to smoother flow of air over the blade surface.

From the above disclosure it will be seen that embodiments of the disclosure provide potentially significant advantages over prior art systems. Application of a protective coating is facilitated, as is repair of the coating. A wide range of printed features may be incorporated in the film, avoiding the need for separate application thereof. Also, the smooth film surface may provide improved aerodynamic and noise performance. Any overlap region in the protective polymeric coating may be located in a position sensitivity to erosion and/or the oncoming air stream is minimum, for example at the trailing edge of the blade airfoil of a blade.

The invention claimed is:

1. A propeller component comprising an external surface exposed in use to an oncoming airstream (A), and a protective polymeric film applied over substantially the entire exposed external surface of the propeller component, wherein the protective polymeric film has first and second end portions, the second end portion overlapping the first end portion in a joint area, the joint area being in a low erosion area in the rear half of a chord of the propeller component.

2. A propeller component as claimed in claim 1, wherein the protective polymeric film is continuous in areas of expected maximum erosion.

3. A propeller component as claimed in claim 1, wherein the joint area is in a trailing edge area of the propeller component.

4. A propeller component as claimed in claim 1, wherein the first and second end portions of the protective polymeric film are arranged such that a free edge of the first end portion faces in a direction towards the direction of the oncoming airstream.

5. A propeller component as claimed in claim 1, wherein the external surface of the propeller component comprises a recess for receiving the first end portion of the protective polymeric film.

6. A propeller component as claimed in claim 1, wherein the protective polymeric film is a one piece film.

7. A propeller component as claimed in claim 1, wherein the propeller component is a blade airfoil of a propeller blade, the protective polymeric film being applied over substantially the entire exposed surface of the blade airfoil, or wherein the propeller component is a propeller spinner.

8. A propeller component of claim 1, wherein the protective polymeric film is polyurethane.

9. A propeller component of claim 8, wherein the protective polymeric film has a thickness of 0.1 to 1.0 mm.

10. A propeller component of claim 8, wherein the protective polymeric film has a thickness of 0.15 to 0.2 mm.

11. A propeller component as claimed in claim 1, wherein an exposed surface of the protective polymeric film is printed.

12. A method of protecting a propeller component having an exposed external surface from erosion comprising applying a protective polymeric film over substantially the entirety of the exposed external surface of the propeller component, and overlapping end regions of the protective polymeric film in a low erosion region of the surface in the rear half of a chord of the propeller component.

13. A method as claimed in claim 12, comprising wrapping the protective polymeric film around the entirety of the exposed external surface of the propeller component.

14. A method as claimed in claim 13, comprising providing a recess in the exposed external surface of the propeller component to receive a first end region of the protective polymeric film.

15. A method as claimed in claim 12, wherein the protective polymeric film is polyurethane.

16. A method as claimed in claim 15, wherein the protective polymeric film has a thickness of 0.1 to 1.0 mm.

17. A method as claimed in claim 16, wherein the protective polymeric film has a thickness of 0.15 to 0.2 mm.

18. A method as claimed in claim 12, wherein an exposed surface of the protective polymeric film is printed.

19. A method of repairing a propeller component as claimed in claim 1, comprising removing a damaged protective polymeric film from substantially the entire exposed external surface and applying a replacement protective polymeric film over substantially the entire exposed external the surface.

20. A propeller component comprising:
an external surface exposed in use to an oncoming airstream (A); and
a protective polymeric film applied over substantially the entire exposed external surface of the propeller component,
wherein the protective polymeric film has first and second end portions, the second end portion overlapping the first end portion in a joint area in a low erosion area in the rear half of a chord of the propeller component, and wherein the first and second end portions of the protective polymeric film are arranged such that a free edge of the first end portion faces in a direction towards the direction of the oncoming airstream and a free edge of the second end portion faces in a direction away from the direction of the oncoming airstream so that the joint area has no discontinuity in the direction towards the direction of the oncoming airstream.

* * * * *